United States Patent
Jacobs

(10) Patent No.: US 9,538,613 B1
(45) Date of Patent: Jan. 3, 2017

(54) LIGHT CONTROLLER AND METHOD FOR CONTROLLING LIGHTS

(71) Applicant: Donald H. Jacobs, St. Louis, MO (US)

(72) Inventor: Donald H. Jacobs, St. Louis, MO (US)

(*) Notice: Subject to any disclaimer, the term of this patent is extended or adjusted under 35 U.S.C. 154(b) by 0 days.

(21) Appl. No.: 14/857,804

(22) Filed: Sep. 17, 2015

Related U.S. Application Data

(63) Continuation-in-part of application No. 14/854,027, filed on Sep. 14, 2015, now abandoned, which is a continuation-in-part of application No. 13/803,967, filed on Mar. 14, 2013, now abandoned.

(60) Provisional application No. 61/718,790, filed on Oct. 26, 2012.

(51) Int. Cl.
| | | |
|---|---|---|
| H05B 37/02 | (2006.01) | |
| H05B 39/04 | (2006.01) | |
| H05B 41/36 | (2006.01) | |
| G01J 1/42 | (2006.01) | |

(52) U.S. Cl.
CPC ......... *H05B 37/0218* (2013.01); *G01J 1/4204* (2013.01); *H05B 37/0227* (2013.01); *H05B 37/0281* (2013.01); *H05B 41/36* (2013.01); *G01J 2001/4266* (2013.01)

(58) Field of Classification Search
None
See application file for complete search history.

(56) References Cited

U.S. PATENT DOCUMENTS

| | | | |
|---|---|---|---|
| 6,680,877 B1 | 1/2004 | Lienau | |
| 7,339,471 B1* | 3/2008 | Chan | G08B 15/002 |
| | | | 315/159 |
| 2010/0295454 A1* | 11/2010 | Reed | H05B 37/0218 |
| | | | 315/152 |
| 2012/0001566 A1 | 1/2012 | Josefowicz et al. | |
| 2012/0262069 A1* | 10/2012 | Reed | H05B 37/0281 |
| | | | 315/130 |

OTHER PUBLICATIONS

"Driving greater efficiency with an easy, stand-alone, dimming control", Philips Lighting Electronics N.A., A Division of Philips Electronics North America Corporation, 2010, 4 pages.
Quick Installation Guide—North American Version; Chronosense Control System LLC7130, Philips Lighting Electronics N.A., A Division of Philips Electronics North America Corporation, 2010, 14 pages.

* cited by examiner

*Primary Examiner* — Anh Tran
(74) *Attorney, Agent, or Firm* — Harness, Dickey & Pierce, P.L.C.

(57) ABSTRACT

A method of estimating the occurrence of midnight on a given day comprises the steps of determining the average night length (NLAVE) by averaging the night lengths (NL) between a night starting time (NST) as determined by a photosensor and a night ending time (NET) determined by a photosensor for each of a plurality of days, and estimating midnight to occur at the time that is one half of the average night length (NLAVE) after the night starting time (NST) for the given day. This estimate of midnight to control the operation of lights or other equipment without the need for clocks or constant power.

5 Claims, 10 Drawing Sheets

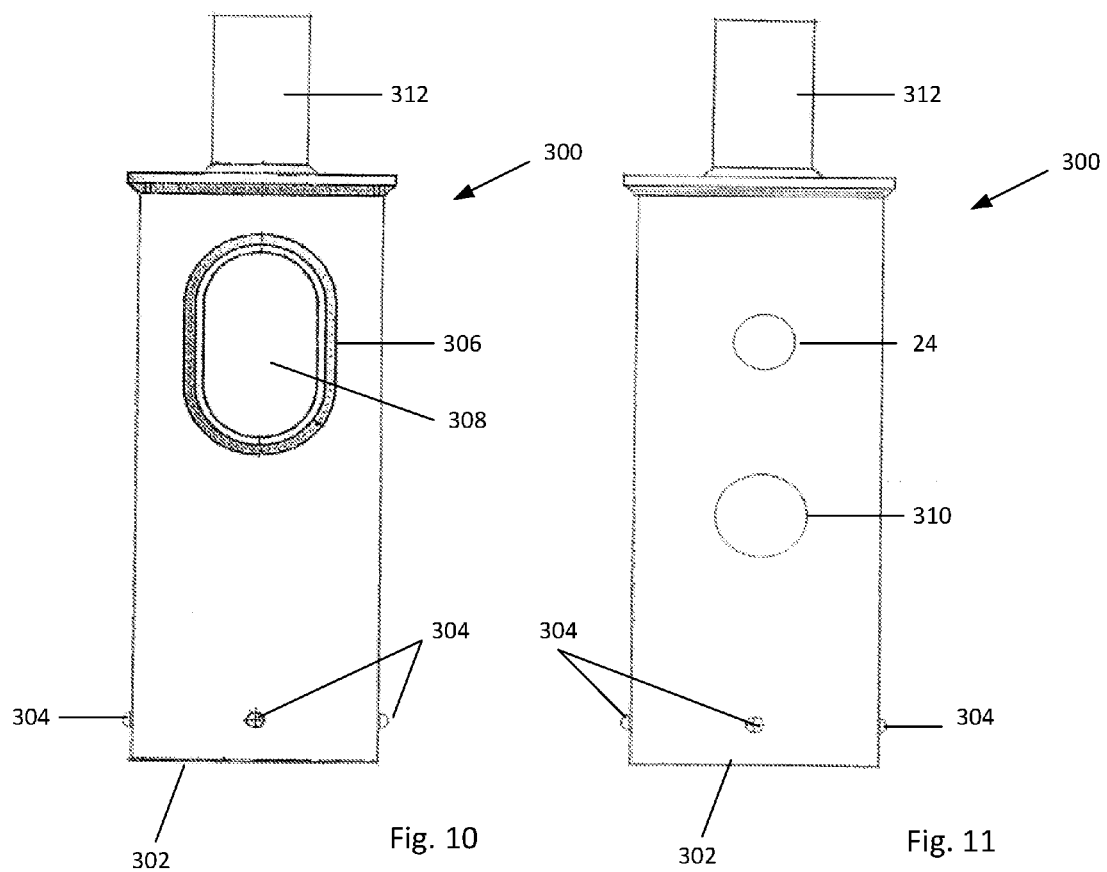

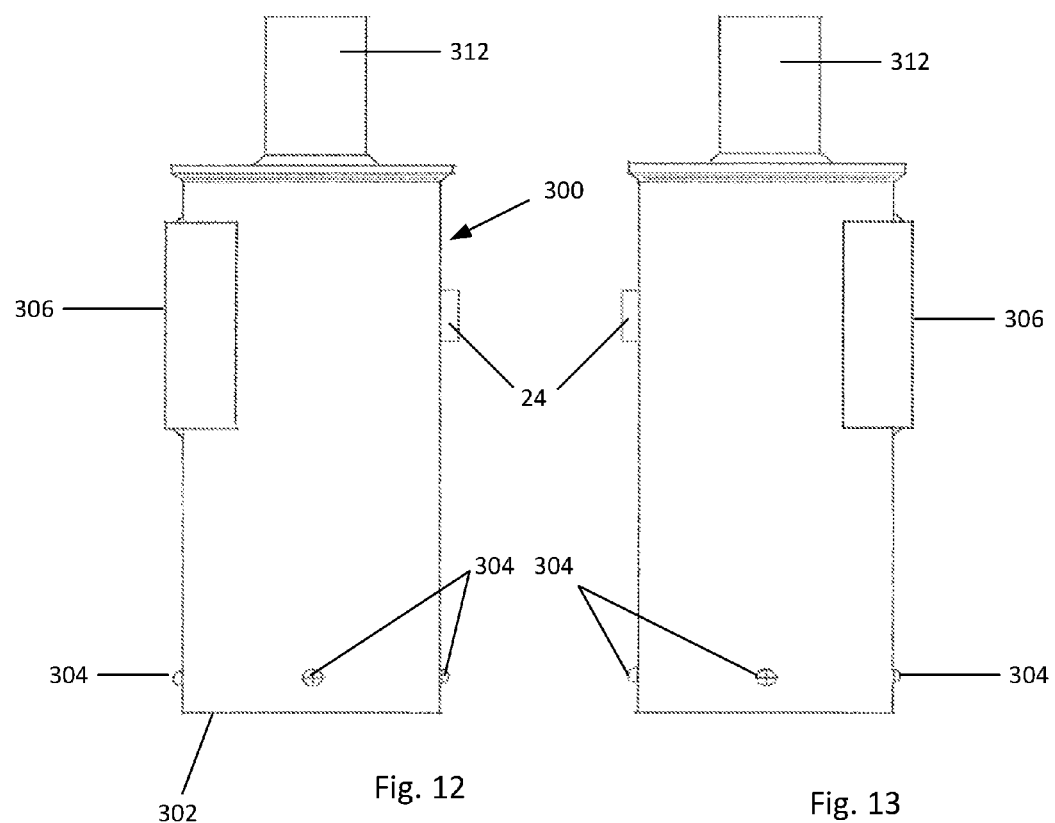

LIGHT CONTROLLER AND METHOD FOR CONTROLLING LIGHTS

CROSS-REFERENCE TO RELATED APPLICATIONS

This application is a continuation in part of U.S. application Ser. No. 14/854,027, filed Sep. 14, 2015, which is a continuation in part of U.S. application Ser. No. 13/803,967, filed Mar. 14, 2013, which claims the benefit of U.S. Provisional Application No. 61/718,790, filed on Oct. 26, 2012. The entire disclosures of the above applications are incorporated herein by reference.

FIELD

The present disclosure relates to light controllers and methods of controlling lights, and in particular to light controllers that operate outdoor lighting systems, such as those in parking lots.

BACKGROUND

This section provides background information related to the present disclosure which is not necessarily prior art.

A significant area for reducing energy consumption is outdoor lighting, such as the lighting of large parking lots with pole mounted luminaires. While it is important to provide lighting when people are present, substantial savings could be had if the lights could be switched to a lower level, when people are not present. However, high intensity discharge (HID) lamps typically used in these applications do not respond quickly when turned off and on in an attempt to save energy. Alternatively introducing a means to change light levels (and their associated energy levels) of the HID lamps without allowing the arc inside the lamp to extinguish would enable the lamp to instantaneously respond to the various passive and active control methodologies.

Active control methodologies would include the use of motion sensors to operate the HID lamps at full intensity only when people are present. In contrast, passive control methodologies would leave the lamps operating at full intensity during the times when people are likely to be present, and only operate them at low intensity during times when people are less likely to be present. This type of control, however, requires information about the current time, and it is difficult to retrofit a control with reliable time keeping to a plurality of individual lights, and keep the time for each control accurate and synchronized with the other controls when power to the pole lighting assembly is interrupted by an external switching process. Typically, the lights are only powered during the evening time, and without power the controls cannot maintain the current time.

SUMMARY

This section provides a general summary of the disclosure, and is not a comprehensive disclosure of its full scope or all of its features.

Embodiments of the present invention provide a lighting control, and a method of controlling lights, that allow operating of the lights at different intensities and energy consumption levels based in part upon the time of day. Some of these embodiments eliminate the need to set the time or to synchronize for individual controllers on multiple lights. According to one embodiment, a method is provided for estimating the time so that lights can be controlled based in part upon the local daylight cycle. (This allows the device to readily accommodate different installation locations at different latitudes and longitudes). This method can, for example, estimate the occurrence of midnight, and based upon that estimate, estimate the occurrence of other times relative to midnight. Based upon these estimates, the control can change the operation of the lamps based upon the approximate time of day. For example, when the lights are turned on at night, each control can provide full power to its respective lamp for a predetermined period of time, and at a particular time in the evening, reduce the power to the lamp to operate it at reduced power, whereupon the control, if desired can resume full power operation of the lamp for a predetermined time. This time based control of the lamp can be accomplished without providing each control with a clock or similar time keeping device, or otherwise having to set and synchronize a clock or time keeping device.

According to one embodiment of the invention, a method of estimating the occurrence of midnight on a given day is provided. The method can comprise the steps of determining the average night length (NLAVE) by averaging the night lengths (NL) between a night starting time (NST) as determined by a photosensor and a night ending time (NET) determined by a photosensor for each of a plurality of days. Midnight is then estimated as occurring at a time that is one half of this average night length (NLAVE) after the night starting time (NST) for the given day. The plurality of days for which the average night length (NLAVE) is determined, is preferably a predetermined number of days, for example, three days, immediately preceding the given day. In some embodiments, the days used in determining the average night length (NLAVE) are a predetermined number of days immediately preceding the given day whose night length (NL) meets a predetermined criteria, such as meeting a minimum or maximum length.

According to another embodiment of this invention, a method of controlling the operation of lights is provided. According to the preferred embodiment of the method, the operation of one or more lights are controlled (changed) based upon the estimated time, which is at a predetermined offset from the estimated occurrence of midnight. This estimated occurrence of midnight can be made by determining the average night length (NLAVE) by averaging the night lengths (NL) between a night starting time (NST) as determined by a photosensor, and a night ending time (NET) determined by a photosensor for each of a plurality of days. Midnight is then estimated as occurring at a time that is one half of this average night length (NLAVE) after the night starting time (NST) for the given day, i.e., $MIDNIGHT_{STANDARD} = NST + \frac{1}{2} NLAVE$. The plurality of days for which the average night length (NLAVE) is determined, is preferably a predetermined number of days, for example three or four days, immediately preceding the given day. In some embodiments, the days used in determining the average night length (NLAVE) are a predetermined number of days immediately preceding the given day whose night length (NL) meets a predetermined criteria, such as meeting a minimum or maximum length.

In some embodiments, the method also automatically accounts for daylight savings time, operating under a standard time algorithm when standard time is in effect, and operating under a daylight savings time algorithm when daylight savings time is in effect. For example the Midnight algorithm above would be adjusted to estimate the occurrence of midnight an hour earlier, i.e., as occurring at a time that is one half of this average night length (NLAVE) after the night starting time (NST) for the given day less one hour: MIDNIGHT$_{DAYLIGHT}$=NST+½ NLAVE−1.

The method can include using the appropriate algorithm (i.e., MIDNIGHT$_{STANDARD}$ or MIDNIGHT$_{DAYLIGHT}$), either based upon an initial setting and/or a detected start or finish of daylight savings time. For example, average night length can be used to infer when daylight savings time begins. A counter for the typical duration of daylight savings time can be implemented that can be decreased each night, and when the counter reaches O, the end of daylight savings time can be inferred.

According to still another embodiment of this invention, a control is provided for controlling at least one light in an outdoor lighting system. The control preferably includes a relay for operating the at least one light; at least one photosensor; and a processor programmed to estimate the occurrence of midnight on the current day by determining the average night length (NLAVE) by averaging the night lengths (NL) between a night starting time (NST) as determined by the at least one photosensor and a night ending time (NET) determined by the at least one photosensor for each of a plurality of days, and estimating midnight on the current day to occur at the time that is one half of the average night length (NLAVE) after the night starting time (NST) for the current day, and operate the relay to control the at least one light at a predetermined period of time offset from the estimated occurrence of midnight. In one embodiment, the control further comprises a motion sensor, and the relay controls the light to operate under control of the motion sensor.

According to an alternate embodiment of a control in accordance with this invention, a control is provided that operates at least one light in a lighting system at reduced power after a predetermined time, unless triggered by a motion sensor. The control preferably includes a relay for operating the at least one light; at least one photosensor; a motion sensor; and a processor programmed to estimate the occurrence of midnight on the current day. The processor preferably estimates the occurrence of midnight by determining the average night length (NLAVE) by averaging the night lengths (NL) between a night starting time (NST) as determined by the at least one photosensor and a night ending time (NET) determined by the at least one photosensor for each of a plurality of days, and estimating midnight on the current day to occur at the time that is one half of the average night length (NLAVE) after the night starting time (NST) for the current day. The control can operate the relay to control the at least one light at a predetermined period of time offset from the estimated occurrence of midnight.

The control can allow the user to set a time period when the lights are operated at full power, and a time period and duration of when the lights are operated at less than full power.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a front elevation view of an alternate housing for housing for use with a round pole mounting a single light;

FIG. 11 is a rear elevation view of the alternate housing;

FIG. 12 is a right side elevation view of the alternate housing;

FIG. 13 is a left side elevation view of the alternate housing;

Corresponding reference numerals indicate corresponding parts throughout the several views of the drawings.

DETAILED DESCRIPTION

Figure 1:
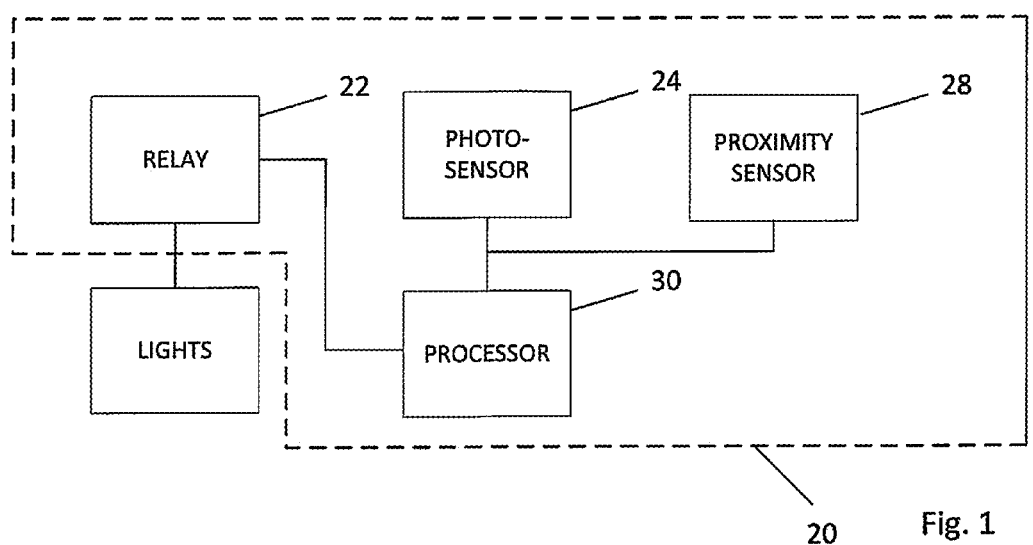
FIG. 1 is a schematic diagram of one preferred embodiment of a light controller in accordance with the principles of this invention.

Example embodiments will now be described more fully with reference to the accompanying drawings.

Estimating the Occurrence of Midnight

A first preferred embodiment of this invention provides a method of estimating the occurrence of midnight on a given day. The preferred embodiment allows for the estimation of the occurrence of midnight without a continuously running clock or continuous electric power. According to the method of this preferred embodiment, the average night length (NLAVE) is determined by averaging the night lengths (NL) between a night starting time (NST) as determined by a photosensor and a night ending time (NET) determined by a photosensor for each of a plurality of days. Midnight is estimated to occur at the time that is one half of the average night length (NLAVE) after the night starting time (NST) for the given day. Of course some fraction of the (NLAVE) other than one half could be used in the estimation of the occurrence of midnight.

The plurality of days for which the average night length (NLAVE) is determined, are preferably a predetermined number of days immediately preceding the given day.

The average night length (NLAVE) is preferably determined over the three or four days immediately preceding the given day. While the (NLAVE) could be determined over fewer (for example one or two days) or more (for example five or six) days, it is believed that either three, or more preferably four days provides a suitably accurate determination that overcomes variances that might occur because of temporary weather or lighting conditions that could affect a measurement of a single night, but which allows for an accurate estimation, in view of the changing night starting time (NST), night ending time (NET), and the resulting night length (NL).

In an alternate embodiment, the night lengths (NL) that are used in the calculation of the average night length (NLAVE) are screened relative to a predetermined criteria. For example, a night length that is less than a predetermined minimum, or exceeds a predetermined maximum, or which varies by more than a predetermined amount (in absolute terms or by percentage) from other recent night lengths (NL) or average night length (NLAVE) might be excluded from the calculation of the average night length (NL), or another recent night length (NL) used in its place, for example an older night length (NL) measurement can be used, one of the night lengths that met the criteria can be overweighted, or a prior (NLAVE) could be used in the calculation of the current (NLAVE).

According to another preferred embodiment of this invention, a method of controlling the operation of an outdoor lighting system is provided. The method can include changing the operation of at least one light in the lighting system at a change time that is a selected offset from the estimated occurrence of midnight. This estimated occurrence of midnight is made by determining the average night length (NLAVE) by averaging the night lengths (NL) between a night starting time (NST) as determined by a photosensor, and a night ending time (NET) determined by a photosensor for each of a plurality of days. Midnight is estimated to occur at the time that is one half of the average night length (NLAVE) after the night starting time (NST) for the current day: $MIDNIGHT_{STANDARD} = NST + \frac{1}{2} NLAVE$. Of course some fraction of the (NLAVE) other than one half could be used in the estimation of the occurrence of midnight.

Provision can be made to adjust the estimation of the occurrence of midnight during daylight savings time. For example the Midnight algorithm above would be adjusted so that midnight is then estimated as occurring at a time that is one half of the average night length (NLAVE) after the night starting time (NST) for the given day less one hour, i.e., $MIDNIGHT_{DAYLIGHT} = NST + \frac{1}{2} NLAVE - 1$.

The plurality of days for which the average night length (NLAVE) is determined are preferably a predetermined number of days immediately preceding the given day. The average night length (NLAVE) is preferably determined over the three days immediately preceding the given day. While the (NLAVE) could be determined over fewer (for example, one or two days) or more (for example, four or seven) days, it is believed that either three, or more preferably four days provides a suitably accurate determination that overcomes variances that might occur because of temporary weather or lighting conditions that could affect a measurement of a single night, but which allows for an accurate estimation, in view of the changing night starting time (NST), night ending time (NET), and the resulting night length (NL).

In an alternate embodiment, the night lengths (NL) that are used in the calculation of the average night length (NLAVE) are screened relative to a predetermined criteria. For example, a night length (NL) that is less than a predetermined minimum, or exceeds a predetermined maximum, or which varies by more than a predetermined amount (in absolute terms or by percentage) from other recent night lengths (NL) or average night length (NLAVE) might be excluded from the calculation of the average night length (NL), or another recent night length (NL) used in its place, for example an older night length (NL) measurement can be used, one of the night lengths that met the criteria can be overweighted, or a prior (NLAVE) could be used in the calculation of the current (NLAVE).

Adjustment for Daylight Savings Time

The controller can automatically accommodate daylight savings time. This can involve an initialization routine in which the controller is set up for daylight savings time operation, and automatic operation where the control automatically infers the start of daylight savings time, and calculates an actual or estimated end of daylight savings time.

A switch 36 can optionally be provided in the control 20 to allow for daylight savings time adjustment. When the controller 20 is installed in a location where daylight savings time is observed, the installer determines whether daylight savings time is in effect at the time of installation, (for example in the U.S. whether it is between the second Sunday in March and the first Sunday in November). If daylight savings time is in effect, the installer can select a daylight savings option setting of "1" through "7" on switch 36 which nominally correspond to the number of months of daylight savings time remaining.

For example in this preferred embodiment, the positions can have the values indicated in the Table:

| Setting | Meaning | Number of Days on Counter |
|---|---|---|
| 0 | Daylight savings never applies to this location) | 0 days |
| 1 | One Month | 50 days |
| 2 | Two Months | 80 days |
| 3 | Three Months | 110 days |
| 4 | Four Months | 140 days |
| 5 | Five Months | 170 days |
| 6 | Six Months | 200 days |
| 7 | Seven Months | 230 days |
| 8 | Daylight savings applies to this location, but is not currently in effect | 0 days |
| 9 | Daylight savings applies to this location, but is not currently in effect. | 0 days |

The switch 36 sets a counter in the controller 20 with the corresponding number of days of daylight savings time remaining. When the controller 20 is installed in a geographic location where daylight savings never occurs, the switch 36 is set to position 0, and only the standard time algorithm will be used in calculating midnight.

When the controller 20 is installed in a location where daylight savings does occur, the installer first determines if daylight savings is currently in effect, and sets the Daylight Savings Option (DSO) setting of "1" through "7" on switch 36 which nominally defines the number of months Daylight Savings will remain in force during the current year in which the Controller is being installed, according to the Table above, or some other scheme.

If, however, Daylight Savings is not currently in force (nominally November 6 through mid-March), the installer assigns a value of either an "8" or "9" on switch 36 and the program assigns a zero ("0") to the nightly countdown counter.

The controller 20 is preferably corresponding configured to implement a daylight savings time program that include a nightly countdown counter. Starting with the initial value set by the switch 36, at the end of every successful nighttime session, the nightly countdown counter value is reduced by 1. As long as the nightly countdown counter contains a positive (non-zero) value then the controller 20 uses a daylight savings algorithm (e.g., $MIDNIGHT_{DAYLIGHT}$) for midnight calculation. Once the nightly countdown counter reaches 0, however, the controller uses a standard time algorithm for midnight calculation (e.g., $MIDNIGHT_{STANDARD}$).

Once operating on the standard time algorithm, at least some embodiments of the controller can automatically shift from the standard time algorithm to the daylight saving time algorithm.

If the nightly countdown counter contains a "0", and switch 36 is set to 1 through 9, the controller 20 performs a daylight savings "threshold test" during which it compares a four night running total (4NA) against a predetermined threshold. In this preferred embodiment this predetermined threshold is 48 hours 40 minutes. Once the four night running total 4NA passes below the 48 hours 40 minutes threshold (meaning that the running 4-night total must have achieved a value less than 48:40 signifying that the nights are getting shorter and winter is ending), the controller 20 begins using the daylight savings algorithm (e.g., MIDNIGHT$_{DAYLIGHT}$) for midnight calculation and a value of 230 is to be provided to the nightly countdown counter. If, however, this running total is greater than or equal to 48:40, the controller continues to operate under the standard time algorithm (e.g., MIDNIGHT$_{STANDARD}$) for midnight calculation.

In one embodiment, the time based change caused by the control is that the light is operated at reduced power, and more preferably the light is operated at reduced power unless triggered by a sensor, such as an optical sensor (e.g., an IR sensor), an acoustic sensor, or a motion sensor.

According to another preferred embodiment of this invention, a control is provided for controlling the operation of an outdoor lighting system. The control, indicated generally as 20 in FIG. 1, preferably comprises a relay 22 for operating at least one light in the lighting system. The control 20 includes at least one photosensor 24 for determining the night starting time (NST). The photosensor 24 can also determine the night ending time (NET), or a separate photosensor can be provided for that purpose. Typically only a single sensor is needed, and it is oriented toward the north. When two photosensors are provided, one can be oriented for detection of the night starting time (for example, facing west) and one can be oriented for detection of the night ending time (for example, facing east). The control also comprises a processor 26 programmed to estimate the occurrence of midnight on the current day by determining the average night length (NLAVE) by averaging the night lengths (NL) between a night starting time (NST) as determined by the at least one photosensor and a night ending time (NET) determined by the at least one photosensor for each of a plurality of days. The control estimates midnight on the current day to occur at the time that is one half of the average night length (NLAVE) after the night starting time (NST) for the current day. The control operates the relay 22 to control the at least one light at a predetermined period of time offset from the estimated occurrence of midnight.

The control 20 preferably includes a proximity sensor 28 for detecting the presence of a person, for example an optical sensor (e.g., an IR sensor), an acoustic sensor, or a motion sensor. The relay 22 controls the light to operate in response to the proximity sensor 28. Thus, the light may operate in full power mode until a predetermined time relative to the estimated occurrence of midnight, and thereafter, operate at reduced power, unless the presence of a person is detected.

The control 20 preferably also contains a processor 30, programmed to control the lights. When the lights are first turned on, the control allows the lights to operate at full power for a predetermined time, to enable the lights to stabilize and function properly. In response to the determination of local sunrise and sunset by the photosensor 24, the processor estimates the occurrence of midnight, as described above. From the estimated occurrence of midnight, the processor 30 can apply a predetermined offset to change the operation of the lights at an approximation of a predetermined time. In this preferred embodiment the processor 26 causes the relay 22 to operate the lights at reduced power for a predetermined period of time. In response to the proximity sensor 28, detecting the presence of people near the light, the processor 30 can operate the relay 22 to operate the lights at a higher power. After a predetermined time and/or when the proximity sensor 28 no longer detects the presence of people, the processor 26 can operate the relay 22 to return the lights to low power. After a predetermined period of time, at an approximate predetermined time, and/or when the photosensors 24 detect morning, the processor 26 can operate the relay 22, again changing the intensity status (lower or off) of the lights to await the next evening cycle.

Thus, the control 20 can be readily retrofit to provide selective timed-based, two-stage operation of HID lights, without the need for an elaborate or expensive control, without the need for a clock and the need to maintain correct clock setting, and without the need for constant power. As long as the control is powered at sunset through sunrise, it can estimate midnight and provide approximate time-based control of the lights.

Figure 2:
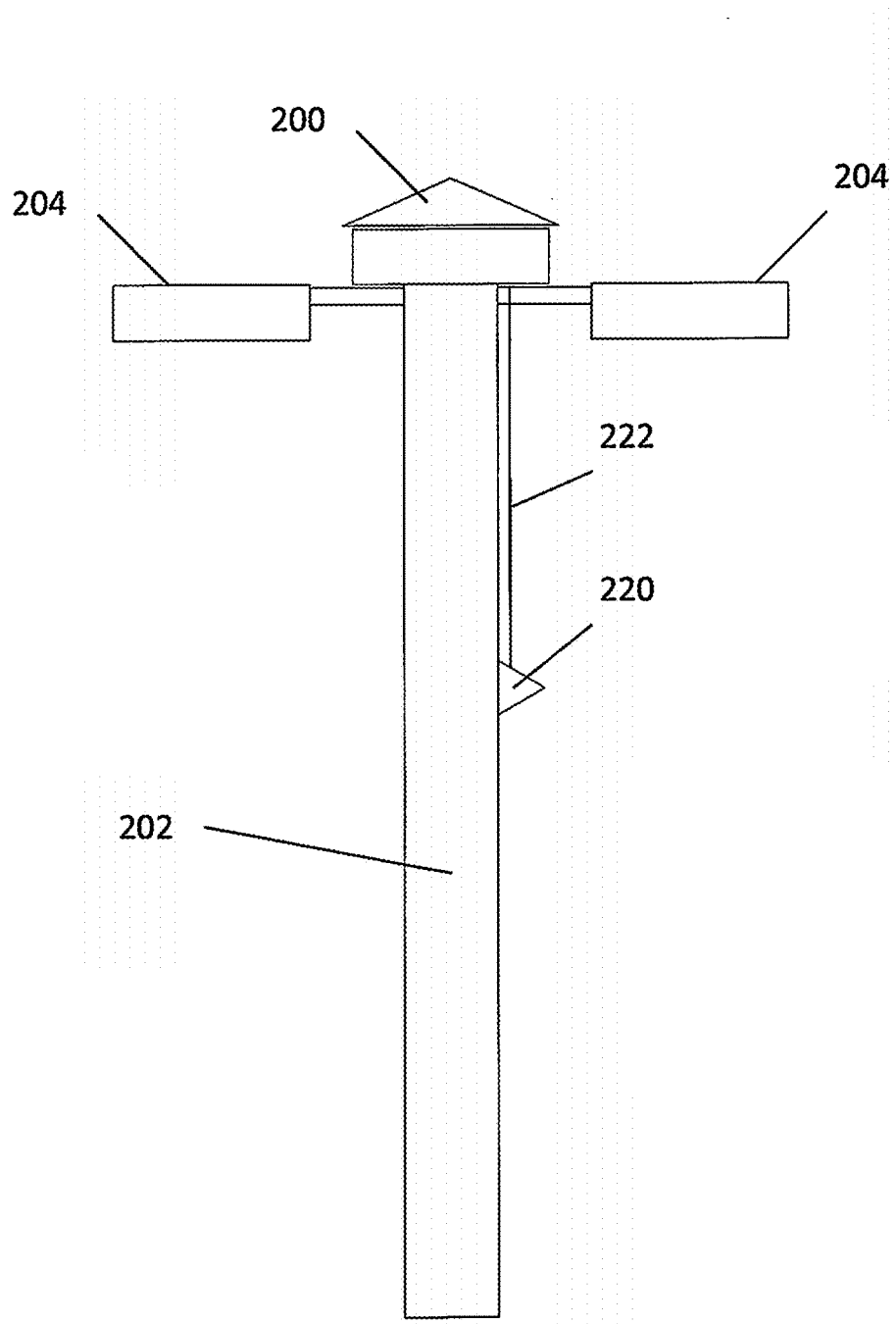
FIG. 2 is a schematic diagram of an embodiment of a light controller according to the principles of this invention, as it could be installed on a typical outdoor lighting fixture.
Figure 3:
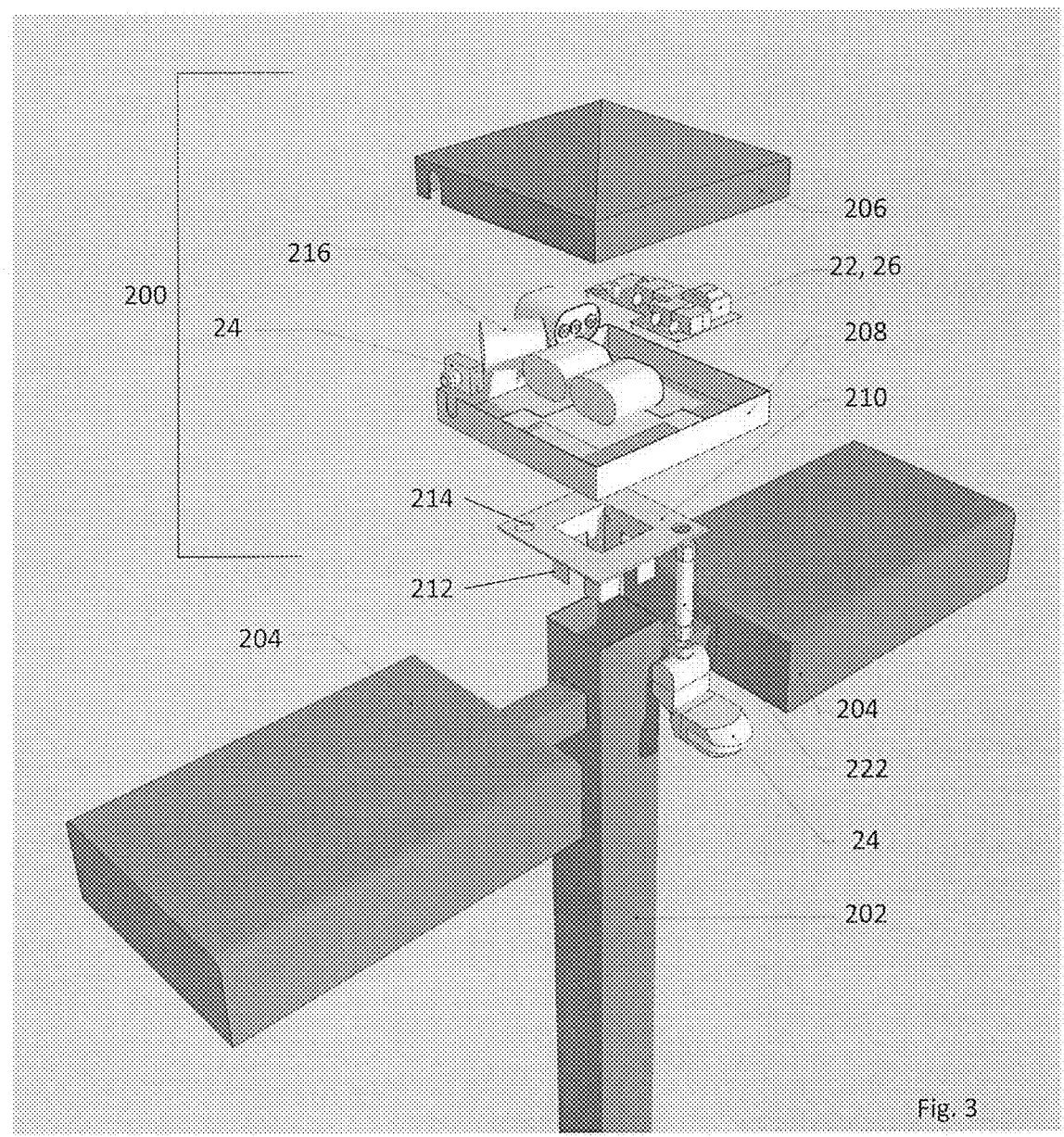
FIG. 3 is an exploded view of the embodiment shown schematically in FIG. 2.
Figure 4:
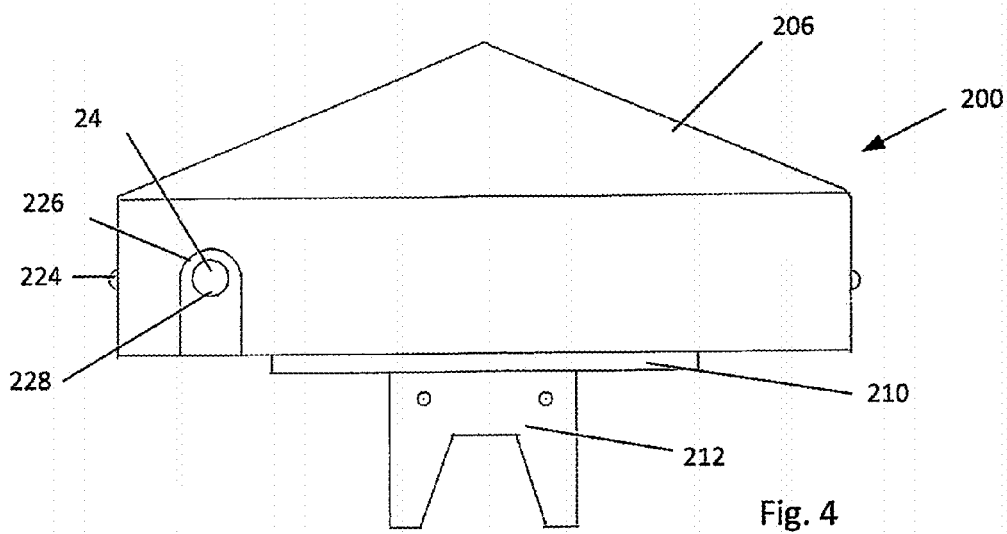
FIG. 4 is a front elevation view of the housing.
Figure 5:
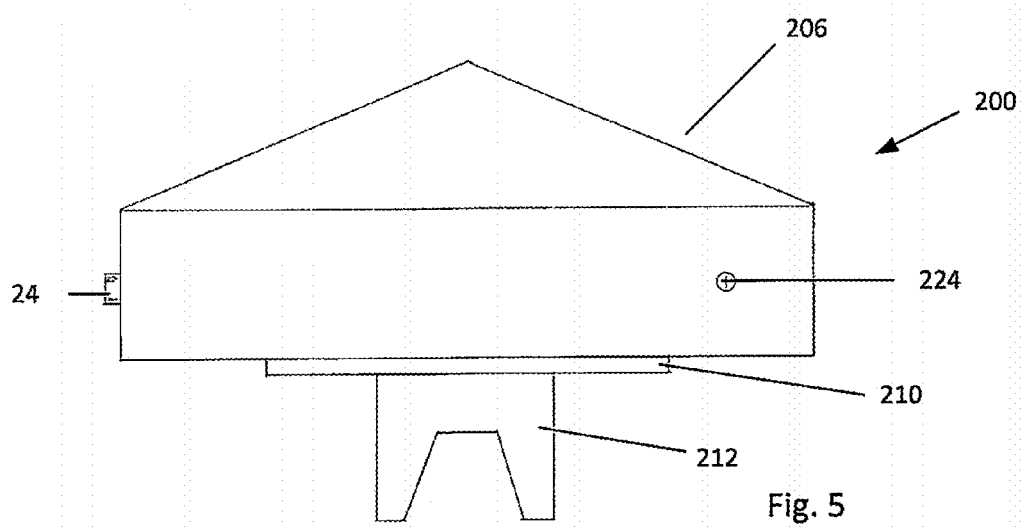
FIG. 5 is a right side elevation view of the housing.
Figure 6:
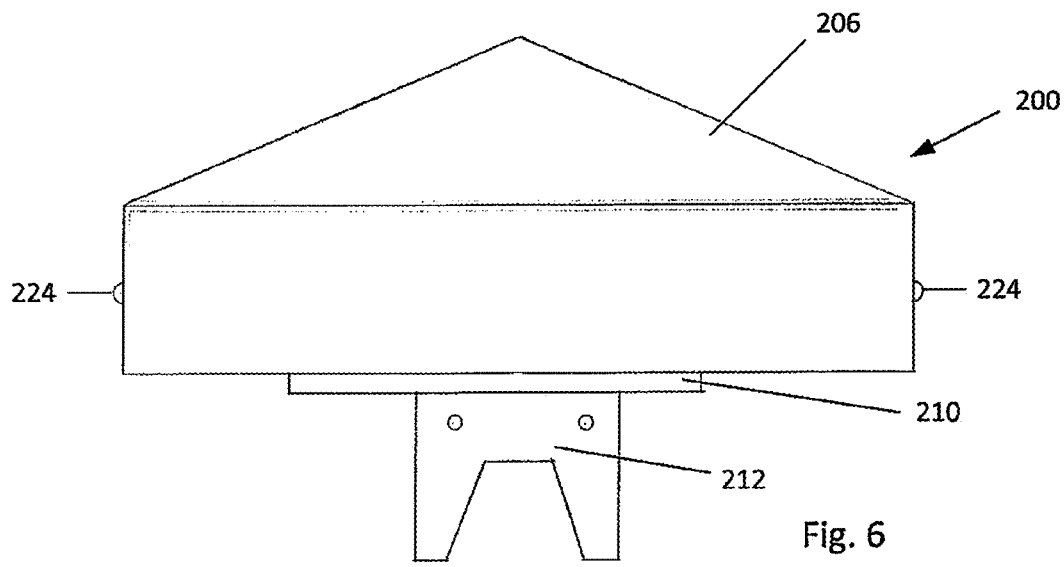
FIG. 6 is a rear elevation view of the housing.
Figure 7:
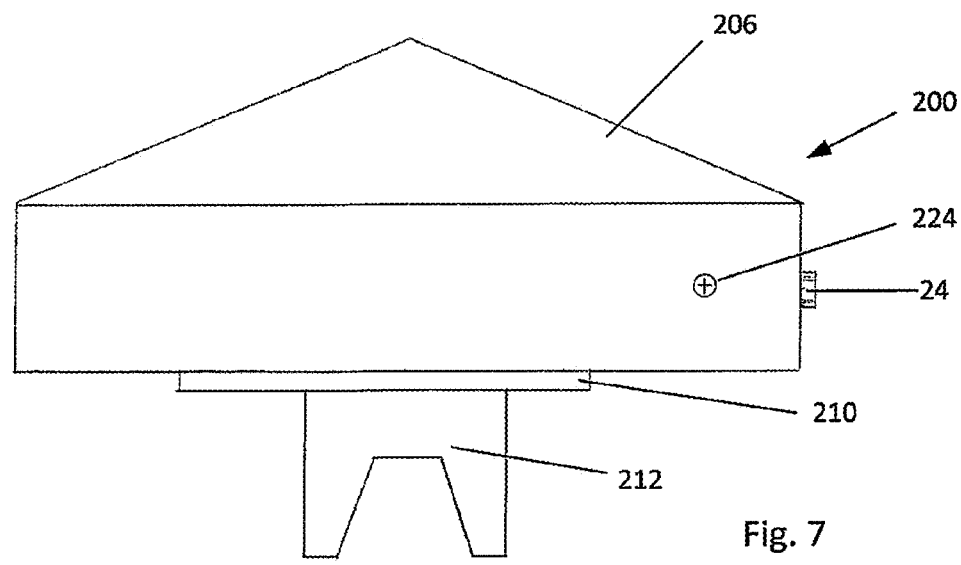
FIG. 7 is a left side elevation view of the housing.
Figure 8:
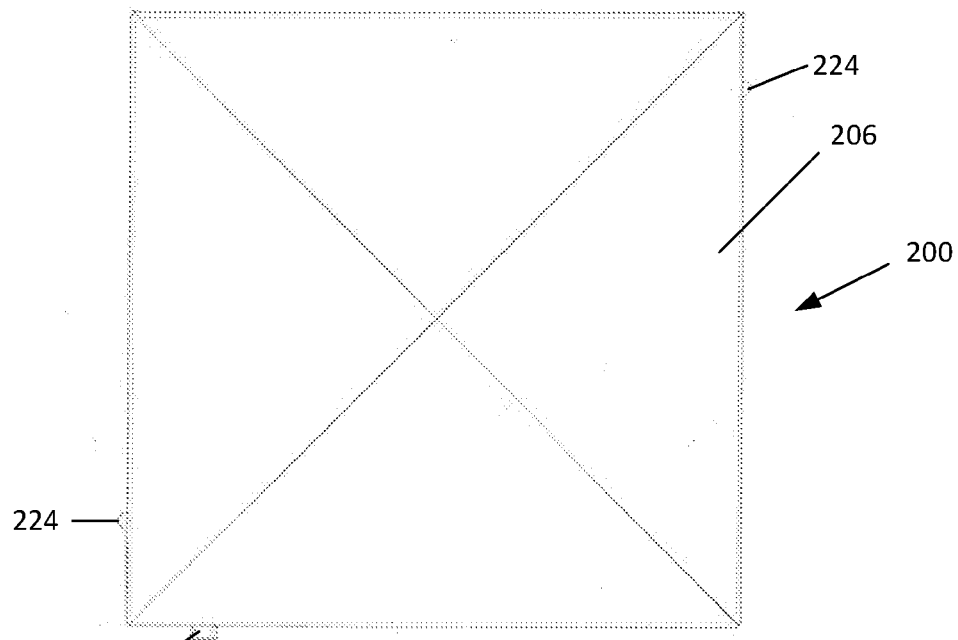
FIG. 8 is a top plan view of the housing.

As shown in FIGS. 2 and 3, the control 20 can be provided in a housing 200 adapted to be mounted on the top of a conventional square or circular light pole 202, mounting one or more lights 204. The housing 200 has a cap 206 shaped like a four-sided pyramid. The cap 206 covers a generally square base 208 in which the control components can be mounted, and connected with the power from the lighting system. The bottom of the base 208 has a mounting bracket 210, with descending flanges 212, with cutouts for accommodating the mountings for the lights 204. The flanges have a shape corresponding to the shape of the light pole 202, to fit over or more preferably in, the light pole. The mounting bracket 210 has closeable access openings 214, for making connections to external components, such as the proximity sensors 28 of the control 20 described above.

The box also contains the control 20 and two stage capacitors 216 for operating the lights 204 at two different power levels, under the direction of control 20. As many as four capacitors 216 supporting different wattages of HID lamps can be provided in the enclosure (as shown) for controlling the lights 204. The photosensor 24 of the control 20 is also provided, and as noted above is preferably oriented to the north.

As shown in FIG. 3, the proximity sensor 28 of control 20 is mounted on the light pole 202, for detecting the presence of people for the control. A connector 222 connects the proximity sensor 28 to remainder of the control in the housing 200.

Table 1 shows the power savings that can be achieved, in both Watt, and by percentage, in operating High Pressure Sodium lights and Metal Halide lights of different wattages at low power levels. These values are illustrative of the types of savings available, the actual savings depending upon the types of lights and the specific "low" level chosen for operation.

| Lamp Wattage (Probe Start Metal Halide) | System Input Watts (High Level) | System Input Watts (Low Level) | Watts Saved | % Energy Saved | Lumen Output % at Low Level |
|---|---|---|---|---|---|
| Probe Start Metal Halide | | | | | |
| 250 | 290 | 145 | 145 | 50% | 30% |
| 400 | 458 | 235 | 223 | 49% | 32% |
| 1000 | 1085 | 650 | 435 | 40% | 44% |
| Pulse Start Metal Halide | | | | | |
| 200 | 227 | 135 | 92 | 41% | 43% |
| 320 | 364 | 185 | 179 | 49% | 32% |
| 875 | 950 | 570 | 380 | 40% | 44% |
| High Pressure Sodium | | | | | |
| 250 | 295 | 178 | 117 | 40% | 44% |
| 400 | 462 | 250 | 2171 | 46% | 36% |
| 1000 | 1065 | 640 | 425 | 40% | 44% |

In alternate embodiment the control 20 can be provided with first switch 32 to set the time at which the control operates the light at reduced power. The control 20 can optionally be provided a second switch 34 to set the duration of how long the lights are operated at reduced power.

Switch 32 can be a multi-position rotary switch or set of switches that allows the user to select one of a plurality of preset options such as those shown in the Table:

| | |
|---|---|
| Option 0 | Turn the lights to LOW at midnight |
| Option 1 | Turn the lights to LOW one (1) hour before midnight |
| Option 2 | Turn the lights to LOW two (2) hours before midnight |
| Option 3 | Turn the lights to LOW three (3) hours before midnight |
| Option 4 | Turn the lights to LOW four (4) hours before midnight |
| Option 5 | Turn the lights to LOW five (5) hours before midnight |
| Option 6 | Turn the lights to LOW six (6) hours before midnight |
| Option 7 | Turn the lights to LOW one (1) hour after midnight |
| Option 8 | Turn the lights to LOW two (2) hours after midnight |
| Option 9 | Turn the lights to LOW three (3) hours after midnight |

While a simple multi-position rotary switch is preferred because it is robust and reliable, inexpensive, and easy to operate, a more complex switch, including a switch with a display, could be provided to allow the user to set the time (relative to determined midnight) that the controller dims the lights by reducing power to the lights.

Similarly, switch 34 can be a multi-position rotary switch or set of switches that allows the user to select one of a plurality of preset options such as those shown in the Table:

| | |
|---|---|
| Option 0 or 1 | Keep the lights at LOW for one (1) hour |
| Option 2 | Keep the lights at LOW for two (2) hours |
| Option 3 | Keep the lights at LOW for three (3) hours |
| Option 4 | Keep the lights at LOW for four (4) hours |
| Option 5 | Keep the lights at LOW for five (5) hours |
| Option 6 | Keep the lights at LOW for six (6) hours |
| Option 7 | Keep the lights at LOW for seven (7) hours |
| Option 8 | Keep the lights at LOW for eight (8) hours |
| Option 9 | Keep the lights at LOW for the remainder of the night |

While a simple multi-position switch is preferred because it is robust and reliable, inexpensive, and easy to operate, a more complex switch, including a switch with a display, could be provided to allow the user to set the time (relative to the time that the light is dimmed) to return the lights to full power.

In some embodiments, a fourth switch can be added to account for systems that are installed where the power to the system does not remain on throughout the entire night cycle, for example where the power to the system is manually switched on and off, or where the power to the system is controlled by a timer that turns off power before the end of the night cycle.

Though not recommended, a property owner may turn their parking lights completely off sometime during the night (say, at 2:00 am) in order to reduce energy costs. The purpose of switch 38 is to allow the owner to gain additional energy savings using our dimming capability in support of their normal business hours while the lights are turned on.

Without the ability to account for this scheme of powering the light controller, when the power to the system is turned off, the power to both the controller and the photosensor is also turned off, and this would cause the system to determine that the end of the nighttime session has occurred. This could interfere with the correct calculation of midnight on which the operation of the system is based. Thus a switch 38 can be used to account for the artificial shortening of night time caused by the loss of power. The switch 38 thus "adds" to the length of the nighttime session in order to bring the length of the nighttime session back in line (within reason) with what would normally occur as a result of monitoring sunset and sunrise activity using the photosensor, in particular to allow programmed dimming of the lights (and any other features based upon the estimated occurrence of midnight).

The appropriate adjustment or "addition" to the duration of night depends upon two factors: the latitude of the location where the system is located, and how many hours before a fixed time, e.g. 6:00 am, that the power is turned off. The latitude matters because the length of solar days (and their corresponding nights) change with latitude. Rather than adjusting for precise latitude, which can be complicated and would require more complex and expensive equipment, bands of latitude can be identified, for example for products for the North American market, a first latitude zone of 25 to 30 degrees N, a second latitude zone of 31 to 42 degrees N, and a third latitude zone of 43 to 47 degrees N could be established. Of course more zone, or zone covering a greater range of latitudes could be provided, and of course zone for southern latitudes could likewise be provided. From the selected zones, an empirical study of the nature by which sunset and sunrise times change from one zone to the next during the course of the year can allow an appropriate adjustment time for each zone, to minimize error from the correct time.

The second part of the amount "added" is the difference between 6:00 am and the time that the power is turned off prematurely. The combination of these two numbers yields an amount of time to be added to the duration of night determined by the photosensor.

Based upon the values set for switches 32 and 34, the lights can go to LOW anywhere between 6 hours before and 3 hours after the calculated midnight, and can stay LOW for as short a time as 1 hour or for the rest of the night. This allows our light levels to operate on a two-step profile, generally resembling the letter "L," with the light first operating at a high level, then operating at a low level. This also optionally allows the light levels to operate on a three-step profile, generally resembling the letter "U," with the light first operating at a high level, then operating at a low level, and again at a high level.

The controller 20 allows the user to easily delay the occurrence of a scheduled dimmed event. If the user desires to delay when the lights would normally dim on a given evening, a momentary power interruption to the controller will restart the current programming calculations without disrupting the normal operation of the lights. Thus, if the lights normally come on at 7 PM, and the user wants to delay the dimming by 2 hours, momentarily interrupting the power at 9 PM (which is 2 hours after the 7:00 pm normal start of that night's nighttime session) will restart the current night's program 2 hours later than when the program normally starts at 7 PM, and thus defers the dimming event by two hours.

To accomplish this momentary power interruption switching of power to the printed circuit board of the controller, an extra-long wiring harness can be installed within the pole to bring this 120 v power supply down to the base of the pole for easy access. This wiring harness enables the installer to introduce a local switching device of his/her choosing in the base of the pole. This local switch can be a simple manual slide switch, or some form of Bluetooth/wireless device that could perform this momentary 120 v power interruption to the printed circuit board. This forced delay in the dimmed event does not impact the normally scheduled dimming of the lights on subsequent nights.

Figure 9:
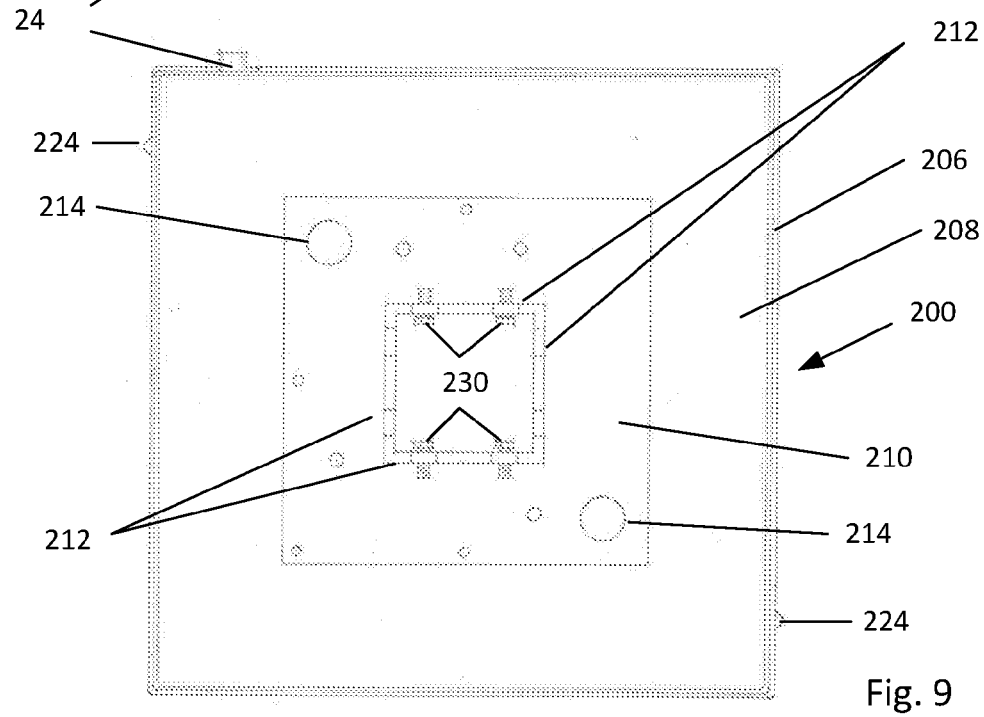
FIG. 9 is a bottom plan view of the housing.
Figure 14:
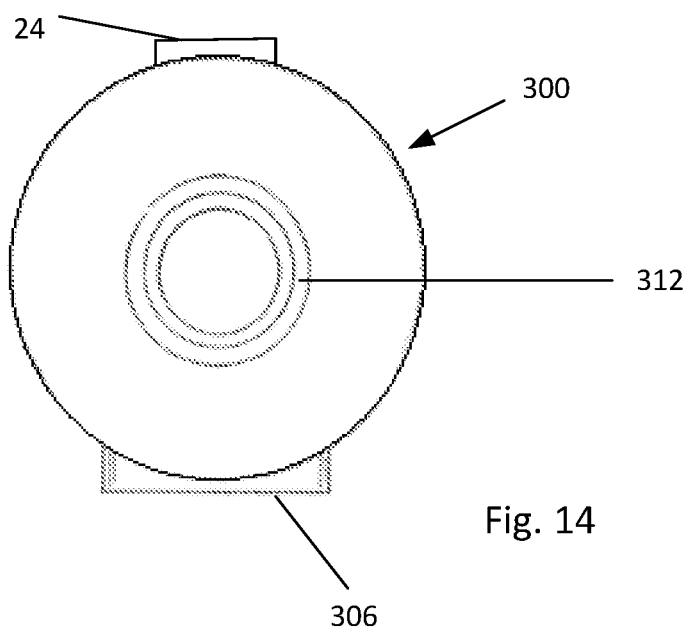
FIG. 14 is a top plan view of the alternate housing.
Figure 15:
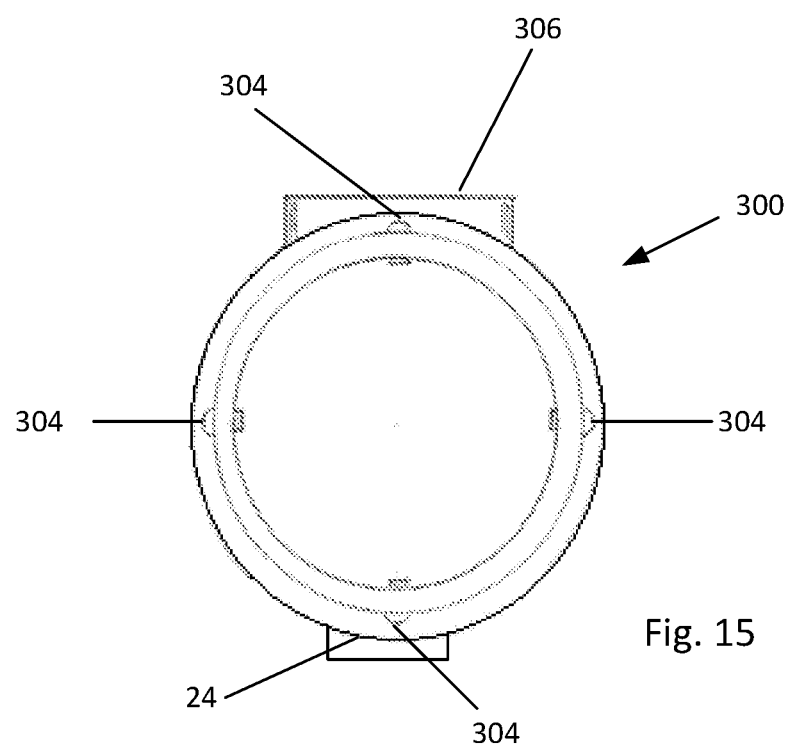
FIG. 15 is a bottom plan view of the alternate housing.
Figure 16:
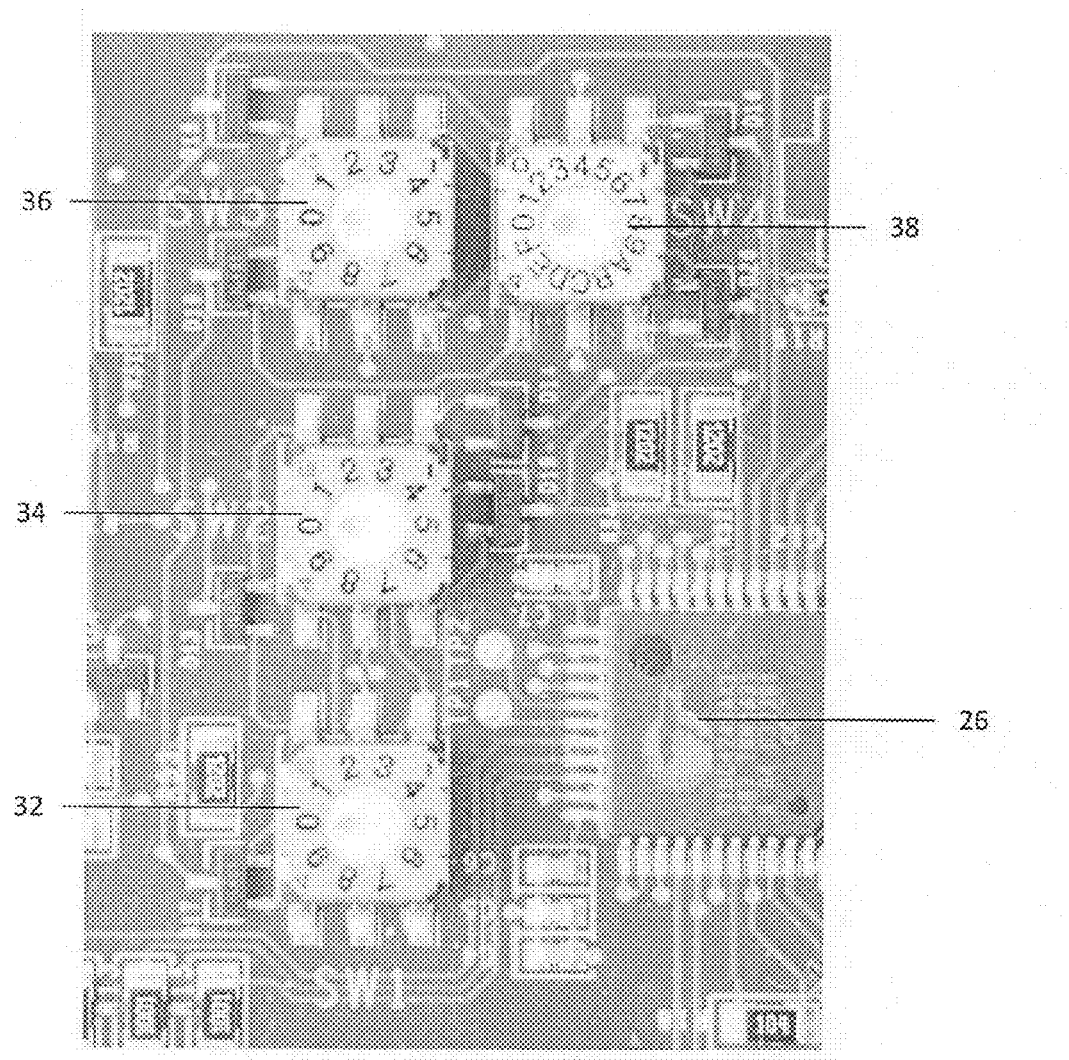
FIG. 16 is a diagram of one possible circuit for implementing a preferred embodiment of the invention.

The housing 200 is shown in greater detail in FIGS. 4-9. As shown in FIGS. 4-9, the cap 206 has a pyramidal top, with sidewalls that descend downwardly over upwardly projecting sidewalls of the base 208. Fasteners, such as screws 224 secure the cap 206 over the base 208. The sidewalls of the cap 206 and the base 208 have aligned notches 226, 228 for receiving the photosensor 24, 218. The flanges 212 descend from the bracket 210, and are preferably sized and positioned to fit inside the top of a pole 202. Alternatively the flanges 212 can be sized to fit on the outside of the top of the pole. As shown in FIG. 9, threaded fasteners 230 can be provided on the flange to engage the top of the pole and secure the housing 200 on the top of the pole. The fasteners 230 can be accessed through the bottom of the base, 208, before the cap 206 is secured.

An alternate housing is indicated generally as 300 in FIGS. 10-15. The alternative housing 300 is particularly adapted to be mounted on a round pole supporting a single light. The housing 300 is generally cylindrical, with an open bottom 302 sized to fit over the top of a round pole. A plurality of screws 304 allow the housing 300 to be secure to the pole. The housing 300 has a hand-opening 306, covered with a removable cover plate 308. A photosensor 24 projects from an opening in the back of the housing, adjacent the top. A knock-out 310 or other access opening is provided so that a connection can be made to a photosensor 24. The top of the housing 300 has a tenon 312 for mounting on the light. The housing thus provides a convenient way to retrofit an existing single light with a control in accordance with the principles of this invention. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control for controlling at least one light in an outdoor lighting system, which control can operate with intermittent power, the control comprising:
   a relay for operating the at least one light;
   at least one photosensor; and
   a processor programmed to actuate the relay to operate the at least one light based upon estimated occurrence of midnight on the current day, the processor automatically selecting between a daylight savings time estimate algorithm and a standard time estimation algorithm for estimating the occurrence of midnight, based upon the value of a daylight savings time counter that is changed each day of daylight savings time until it reaches a predetermined value indicative of the end of daylight savings time.

2. The control according to claim 1, wherein the estimated occurrence of midnight is based at least in part upon the night start time (NST) as determined by at least one of the at least one photosensors and an average night length (NLAVE) based in part on between a night starting time (NST) determined by at least one of the at least one photosensor and a night ending time (NET) determined by at least one of the at least one photosensor for each of a plurality of days.

3. The control according to claim 1 wherein the daylight savings time counter contains a number related to the number of days remaining in daylight savings time, and wherein the value of the counter is reduced each day during daylight savings time.

4. The control according to claim 1 wherein the daylight savings counter is set during the initialization of the control based upon the number of days remaining in the current daylight savings time period, and thereafter automatically reset to predetermined value at the estimated start of daylight savings time.

5. The control according to claim 4 wherein the estimated start of daylight savings time is determined when the sum of the duration of a predetermined number of nights, as determined by the difference between a night start time NST and a night end time NET, falls below a predetermined value.

* * * * *